(12) United States Patent
Tseng et al.

(10) Patent No.: US 10,170,060 B2
(45) Date of Patent: Jan. 1, 2019

(54) INTERLACED LIQUID CRYSTAL DISPLAY PANEL AND BACKLIGHT USED IN A HEAD MOUNTED DISPLAY

(71) Applicant: Facebook Technologies, LLC, Menlo Park, CA (US)

(72) Inventors: Shie Ping Jeffrey Tseng, Los Altos, CA (US); Evan M. Richards, Santa Clara, CA (US); Jianru Shi, Union City, CA (US); Yue Shi, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/391,034

(22) Filed: Dec. 27, 2016

(65) Prior Publication Data
US 2018/0182307 A1    Jun. 28, 2018

(51) Int. Cl.
| | |
|---|---|
| G09G 3/34 | (2006.01) |
| G09G 3/02 | (2006.01) |
| G09G 3/36 | (2006.01) |
| G06F 3/01 | (2006.01) |
| G02F 1/13357 | (2006.01) |
| G02F 1/1335 | (2006.01) |

(52) U.S. Cl.
CPC ......... *G09G 3/3413* (2013.01); *G02F 1/1336* (2013.01); *G06F 3/012* (2013.01); *G06F 3/013* (2013.01); *G09G 3/02* (2013.01); *G09G 3/3611* (2013.01); *G02F 2001/133626* (2013.01); *G02F 2201/30* (2013.01); *G09G 2310/0224* (2013.01); *G09G 2310/0237* (2013.01); *G09G 2310/08* (2013.01)

(58) Field of Classification Search
CPC .................................................... G09G 3/3413
USPC ......................................................... 345/691
See application file for complete search history.

(56) References Cited

U.S. PATENT DOCUMENTS

| | | | |
|---|---|---|---|
| 2010/0302634 A1* | 12/2010 | Jung | G02B 27/2242 359/465 |
| 2011/0157471 A1* | 6/2011 | Seshadri | G06F 3/14 348/564 |
| 2013/0088466 A1* | 4/2013 | Odake | H04N 13/0409 13/409 |

\* cited by examiner

*Primary Examiner* — Long D Pham
(74) *Attorney, Agent, or Firm* — Fenwick & West LLP

(57) ABSTRACT

A liquid crystal display (LCD) device is driven in interlaced scan to accommodate for liquid crystal (LC) setting times without sacrificing brightness. The LCD device includes an LCD panel including a first group of (e.g., even) pixel lines and a second group (e.g., odd) pixel lines, a backlight disposed behind the LCD panel to emit light toward the even and odd pixel lines, a shift grating disposed between the LCD and the backlight, the shift grating configured to block the light from the backlight from reaching either the first group of pixel lines or the second group of pixel lines, and a controller. The controller drives the LCD panel using an interlaced scan, coordinates the activation of the backlight (e.g., a strobed backlight), and changes the state of the shift grating to block the light from the backlight from reaching either the first group of pixel lines or the second group of pixel lines.

22 Claims, 10 Drawing Sheets

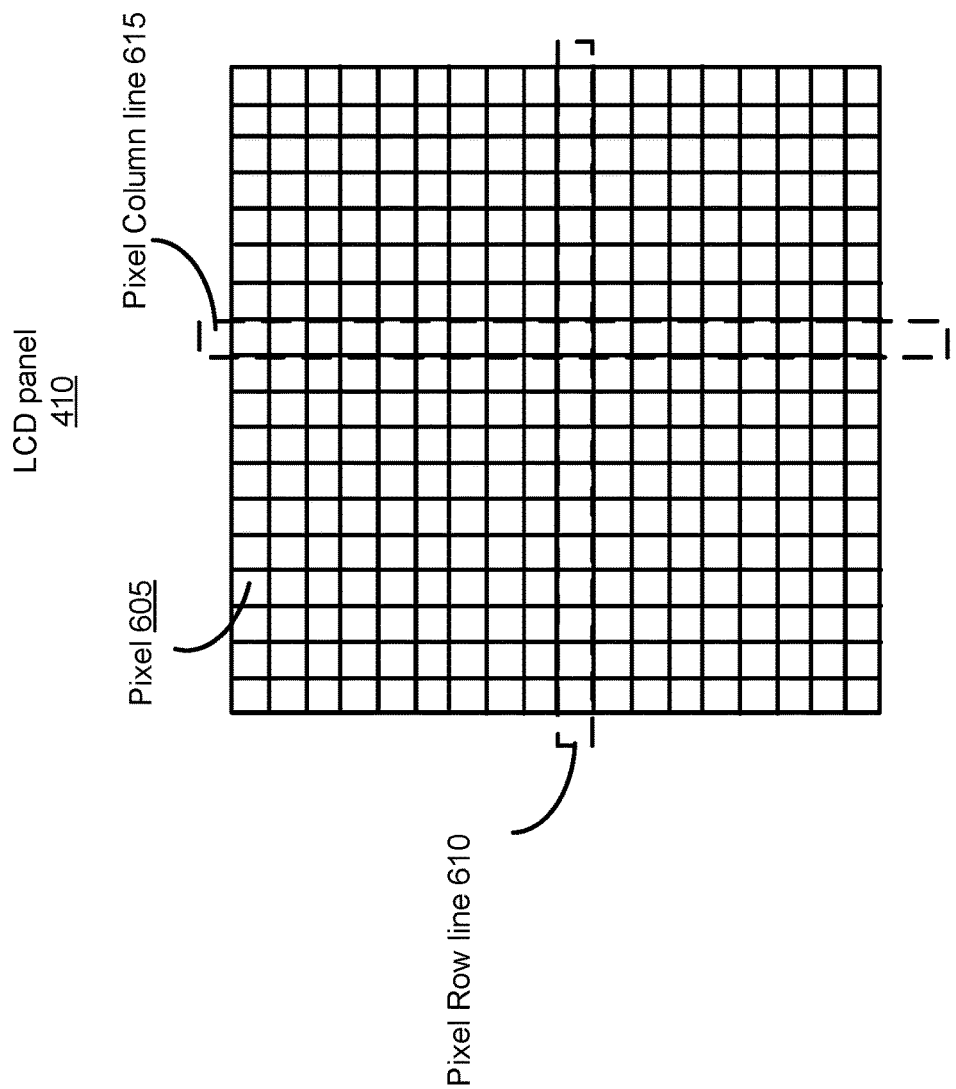

INTERLACED LIQUID CRYSTAL DISPLAY PANEL AND BACKLIGHT USED IN A HEAD MOUNTED DISPLAY

BACKGROUND

Edge-lit backlights provide illumination for pixels of liquid crystal displays (LCD) panels of LCD devices. Each pixel of the LCD panel includes liquid crystals that are set to a particular state such that light from the backlight passes through or is blocked by the liquid crystals and produces a particular pixel color output accordingly. The liquid crystals have a set time between states that impacts how quickly the pixel can transition in response to programming from an input control signal. The setting times for liquid crystals may vary based on factors such as the material type, cell gap, initial state, and final state.

In progressive readout displays, a progressive scan is used where different pixels are programmed at different times based on their location on the LCD panel. The transition between two states of a liquid crystal depends on the timing of input control signals and the setting time of the liquid crystal. If a pixel (e.g., at the end of the progressive scan) is illuminated by the backlight when the liquid crystals of the pixel are not set to the desired state, the pixel may fail to output the desired pixel color. This can result in undesirable effects that reduce the quality of the LCD device output, such as ghosting (trailing images), motion blur, or smearing. While slowing the refresh rate or periodicity of a strobed backlight can help accommodate for liquid crystal (LC) setting time, this results in reduced brightness for the backlight. Thus, there is a need to coordinate backlight control with LC setting times without sacrificing brightness.

SUMMARY

Head-mounted displays (HMDs) and display devices optimized for HMDs are discussed herein. Some embodiments include a display device, comprising: a liquid crystal display (LCD) panel including first a group of (e.g., even) pixel lines and a second group of (e.g., odd) pixel lines; a backlight disposed behind the LCD panel to emit light toward the first group and second group of pixel lines; a shift disposed between the LCD and the backlight, configured to block the light from the backlight from reaching either the first group of pixel lines or the second group of pixel lines; and a controller. The controller is configured to: set the first group of pixel lines with first group line data for a video frame; control the shift grating and backlight such that the backlight illuminates the first group of pixel lines when the first group of pixel lines are set with the first group line data. While the backlight is illuminating the first group of pixel lines and the first group line data is set on the first group of pixel lines, the controller is configured to: set the second group of pixel lines with second group line data for the video frame; and control the shift grating and the backlight such that the backlight illuminates the second group of pixel lines when the second group of pixel lines are set with the second group line data.

For example, the backlight is a strobed backlight that is flashed on and off. The shift grating is transitioned between first and second states to block the light from the backlight such that the backlight alternatively illuminates the first group of pixel lines or the second group of pixel lines. The controller controls the strobed backlight and the shift grating according to a periodic signal or duty cycle.

In some embodiments, the first group of pixel lines and the second group of pixel lines include pixel line pairs, each pixel line pair including a first pixel line and an adjacent second pixel line. The LCD device includes micro-optics elements in front of the LCD panel configured to, for each pixel line pair, spread light from the first pixel line and the adjacent second pixel line across a pixel space of the pixel line pair.

Some embodiments may include a HMD including an LCD display device. The LCD device includes an LCD panel, a backlight disposed behind the LCD panel to emit light toward a first group of and a second group of pixel lines; a shift grating disposed between the LCD and the backlight, configured to block the light from the backlight from reaching either the first group of pixel lines or the second group of pixel lines; and a controller to drive the LCD panel in interlaced scan, and control the shift grating and backlight.

BRIEF DESCRIPTION OF THE DRAWINGS

FIGS. 6A and 6B show an LCD panel, in accordance with some embodiments.

Figure 1:
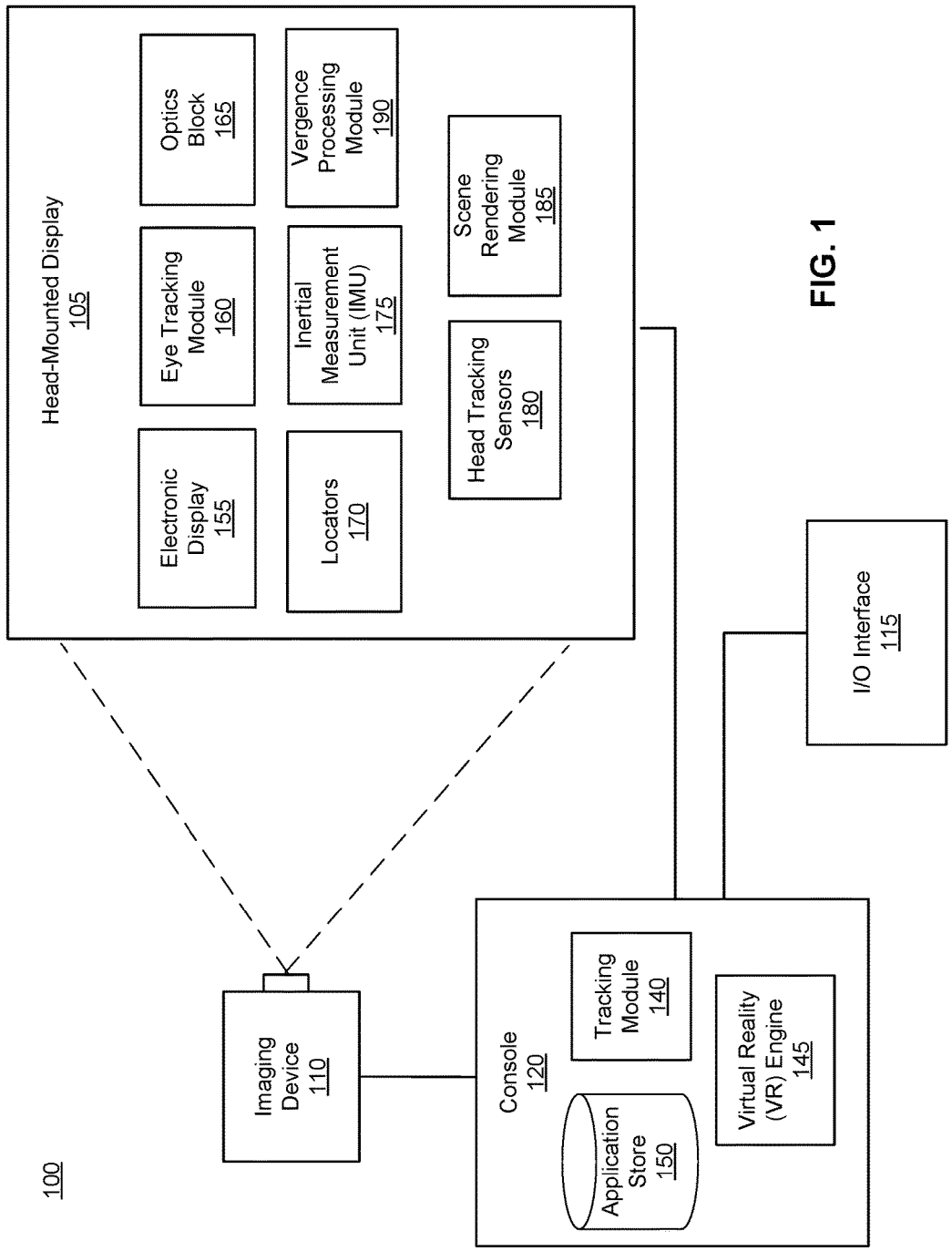
FIG. 1 shows a system, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing an LCD device optimized for head-mounted displays (HMD) are discussed herein. The LCD device includes an LCD panel including different groups of pixel lines, such as even pixel lines and odd pixel lines. The LCD device also includes a backlight disposed behind the LCD panel to emit light toward the even and odd pixel lines, a shift grating disposed between the LCD and the backlight, the shift grating configured to block the light from the backlight from reaching either the even pixel lines or the odd pixel lines, and a controller that coordinates setting of the pixel lines, flashing of the backlight, and state change of the shift grating. For example, the controller drives the LCD panel using an interlaced scan for the even and odd pixel lines, and coordinates the activation of the backlight (e.g., a strobed backlight), and changes the state of the shift grating to block the light from the backlight from reaching either the even pixel lines or the odd pixel lines.

For each video frame, the controller generates even line data and odd line data for the even and odd pixel lines respectively. The controller sets the even pixel lines with the even line data, in a first step of the interlaced scan. The shift grating is set to an even state to prevent the strobed backlight from illuminating the odd line pixels. When the even pixel lines are set, the even pixel lines are illuminated with the strobed backlight, which is flashed on and off according to a periodic signal. While the even pixel lines are illuminated, the controller sets the odd pixel lines with the odd line data in a second step of the interlaced scan. The controller sets the shift grating to an odd state to prevent the strobed backlight from illuminating the even line pixels. When the odd pixel lines are set, the odd pixel lines are illuminated with the strobed backlight.

The interlaced scan may be repeated for additional video frames. The even line data for the next video frame, for example, is set on the even pixel lines while the odd pixel lines are illuminated with the odd pixel line data of the current video frame, and so forth. Advantageously, the allotted setting time for each pixel of the LCD panel is increased (e.g., doubled) to two on-off periods of the strobed backlight. Reducing the periodicity or duty cycle of the strobed backlight results in reduced brightness, which is not desirable for HMDs and many other types of displays. Thus, it is desirable that liquid crystals of the pixels are allotted sufficient time to completely transition to a desired state prior to illumination by a strobed backlight—without necessarily requiring a reduction in the periodicity or duty cycle for the strobed backlight.

Some embodiments discussed herein provide a single backlight solution for interlaced LCD panels by leveraging a shift grating that transitions between the even and odd states. In response to a shift grating control signal from the controller, the shift grating blocks backlight illumination to either the even or odd pixel lines of the LCD panel.

Some embodiments of the LCD device further include micro-optic elements disposed in front of the LCD panel. The even and odd pixel lines may define pixel line pairs, where each pixel line pair includes an even pixel line and an adjacent odd pixel line. For a frame of video, the controller sets even line data and odd line data for a pixel line pair with the same data. The micro-optic elements distribute light from the even or odd pixels of a pixel line pair across the pixel space of the pixel line pair. As such, a full image is provided across the pixel space of all pixels of the LCD panel throughout the interlaced scan, even though the strobed backlight alternatively illuminates even or odd pixel lines.

System Overview

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and a I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

As discussed in greater detail below, the electronic display 155 is an LCD device including a LCD panel, a shift grating, a backlight, and a controller. The controller coordinates interlaced scanning and setting of pixels of the LCD panel, the selective blocking of illumination from the backlight on odd and even pixel lines by the shift grifting, and the flashing of the strobed backlight. Among other advantages, the electronic display 155 increases (e.g., doubles) the amount of time available for liquid crystal setting before illumination by the strobed backlight without requiring a change in periodicity or duty cycle for the strobed backlight that would decrease brightness.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 190, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 170 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 165 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
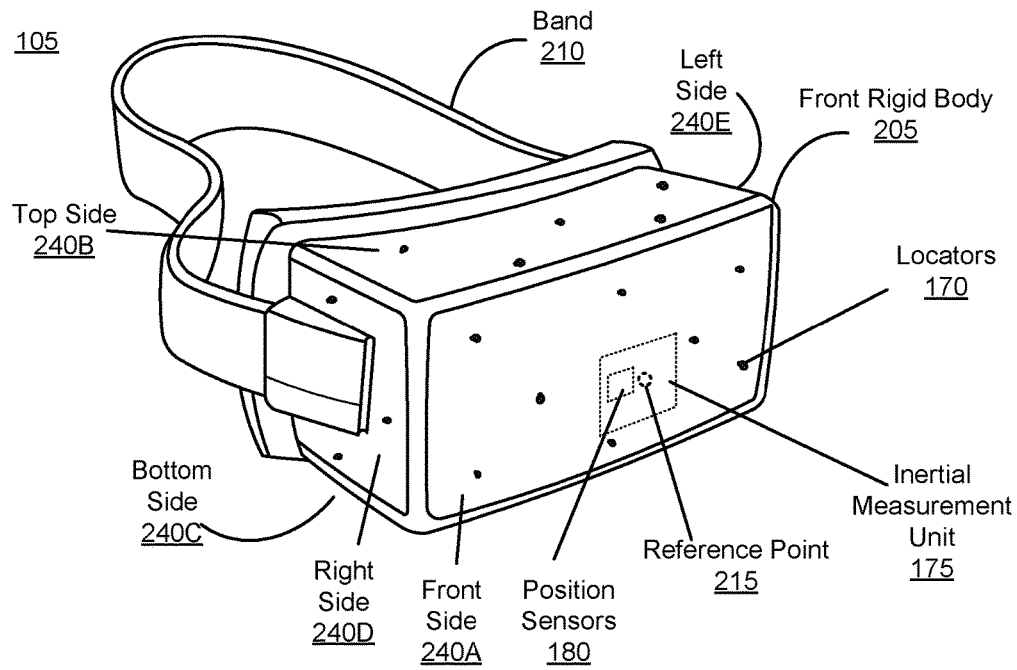
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 175 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
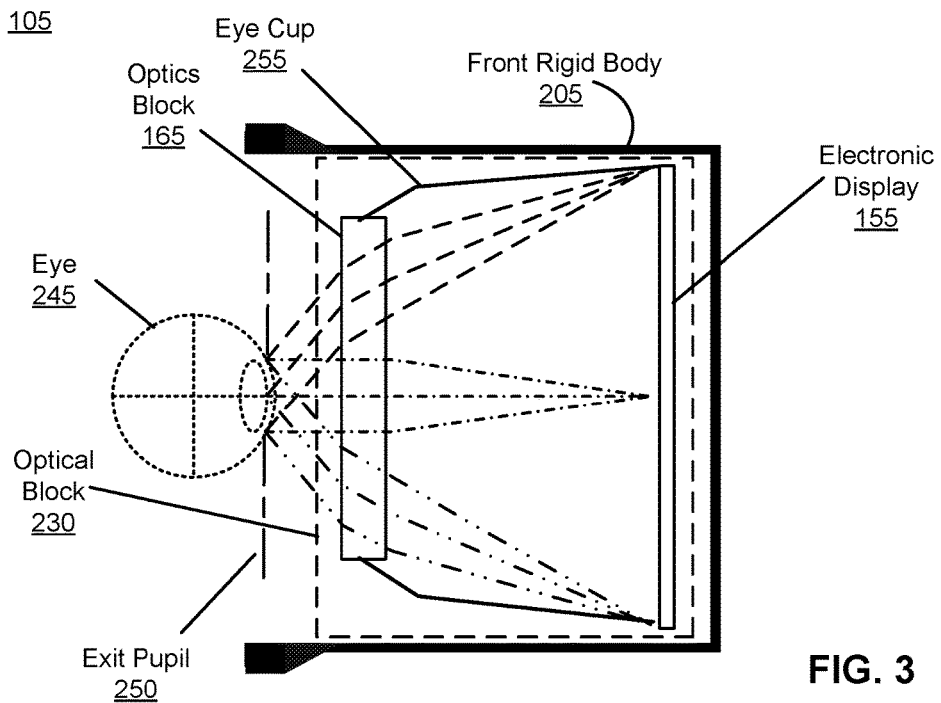
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

Figure 4:
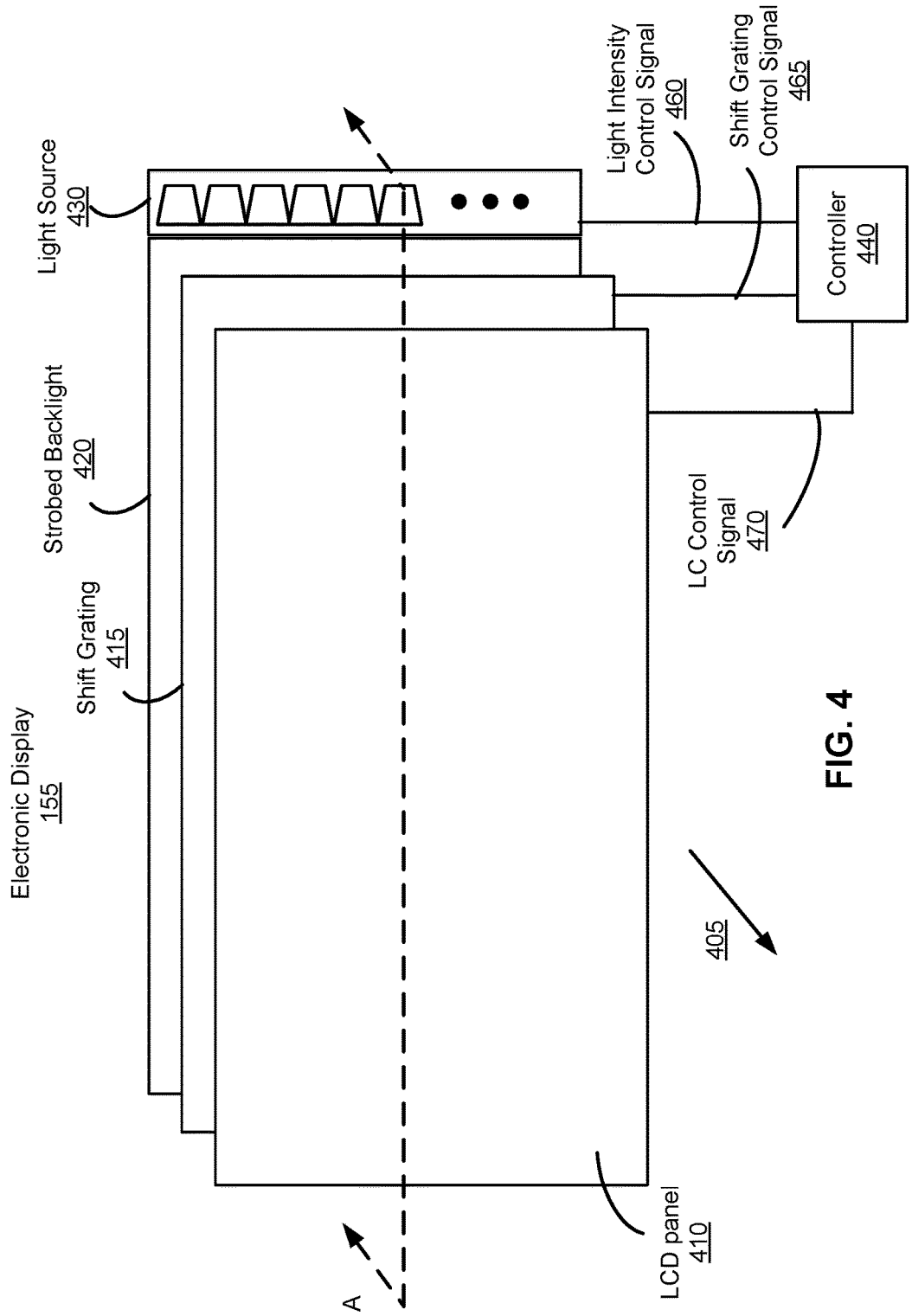
FIG. 4 shows an exploded front view of an electronic display, in accordance with some embodiments.

FIG. 4 shows an exploded front view of an example of an electronic display 155. Although the HMD 105 may include various types of displays, the electronic display 155 in this embodiment is a LCD device including a liquid crystal display (LCD) panel 410, shift grating 415, a strobed backlight 420, and a controller 440. The strobed backlight 420 emits light through the shift grating 415, and towards the exit pupil 250 through the LCD panel 410 in a direction 405. The LCD panel 410 is disposed between the strobed backlight 420 and the exit pupil 250, and controls an amount of light from the backlight 420 to pass through in the direction 405. In other embodiments, the electronic display 155 includes different, or fewer components than shown in FIG. 4.

The controller 440 coordinates the control of the LCD panel 410, shift grating 415, and strobed backlight 420. The LCD panel 410 includes interlaced groups of pixel lines, which are referred to herein as even pixel lines and odd pixels lines. For a frame of video, the controller 440 generates first group data (or "even line data") for the first group of pixel lines (or "even pixel lines") and second group data (or "odd line data") for the second group of pixel lines (or "odd pixel lines") of the LCD panel 410.

The strobed backlight 420 flashes on and off as set by the controller 420. The controller 440 is configured to provide a light intensity control signal to the strobed backlight 420 that controls the timing of the flashing. The flashing uses a fast duty cycle such that the strobed backlight 420 appears to provide a constant and even source of illumination to a user viewing the LCD panel 410. In some embodiments, the backlight is not strobed, but kept on throughout interlaced scans of the LCD panel 410.

The shift grating 415 is disposed between the LCD panel 410 and the strobed backlight 420. The shift grating 415 selectively blocks light from the strobed backlight 420 such that the strobed backlight 420 alternatively illuminates the even pixel lines or the odd pixel lines. The controller 440 is configured to provide a shift grating control signal 465 to the shift grating 415 to select the blocking of light from the strobed backlight 420 to either the even pixel lines or the odd pixel lines of the LCD panel 410.

For a video frame, the controller 440 sets the even pixel lines with even line data, and controls the shift grating 415 and the strobed backlight 420 such that the strobed backlight 420 illuminates the even pixel lines when the even pixel lines are set with the even line data. While the strobed backlight 420 is illuminating the even pixel lines and the even line data is set on the even pixel lines, the controller 440 sets the odd pixel lines with odd line data for the video frame. The controller 440 controls the shift grating 415 and the strobed backlight 420 such that the strobed backlight 420 illuminates the odd pixel lines when the odd line pixel lines are set with the odd line data.

While the strobed backlight 420 is illuminating the odd pixel lines and the odd line data is set on the odd pixel lines, the controller 440 sets the even pixel lines with second even line data for a second (e.g., next) video frame, and controls the shift grating 415 and the strobed backlight 420 such that the strobed backlight 420 illuminates the even pixel lines when the even pixel lines are set with the second even line data for the second video frame. While the strobed backlight 420 is illuminating the even pixel lines and the second even line data is set on the even pixel lines, the controller 440 sets the odd pixel lines with second odd line data for the second video frame, and controls the shift grating 415 and the strobed backlight 420 such that the strobed backlight 420 illuminates the odd pixel lines when the odd pixel lines are set with the second odd line data for the second video frame.

The interlaced scan and control may be repeated for multiple video frames. Because even line pixels are transitioned between states while the odd line pixels are set at a state and illuminated, and vice versa, the amount of time available for LC setting before illumination of a pixel by the strobed backlight 420 is increased for a constant period or duty cycle of the strobed backlight 420. For example, each pixel does not need to be completely set within an on-off period of the strobed backlight 420 because each pixel is illuminated every other on-off period.

The strobed backlight 420 includes light sources 430 that generate light. In some embodiments, the light sources 430 include edge-lit LEDs arranged along one or more edges of the display panel 410. The edge-lit LEDs may include white LEDs, or color LEDS (e.g., red, green, and blue LEDs). The edge-lit LEDs emit light into a light guide, and the light guide directs and distributes the light to the pixels of the LCD panel 410. When color LEDs are used for the light sources 430, the light guide outputs a combined light having a color corresponding to a combination of colors of the received light from the color LEDs. In some embodiments, the light sources 430 are direct-lit LEDs arranged (e.g., in a 2 dimensional array) behind the display panel 410 to illuminate the pixels of the pixels of the display panel 410.

In some embodiments, the intensity and timing of light from a light source 430 of the strobed backlight 420 is adjusted according to the light intensity control signal 460 from the controller 440. The light sources 430 may be switched on and off over time according to a periodic signal or duty cycle. The light intensity control signal is a signal indicative of intensity of light to be output for each light source 430. In some embodiments, different colored light sources 430 can output corresponding light with different intensity, according to the light intensity control signal. For example, a red light source outputs red light with an intensity corresponding to '10' out of '255', a green light source outputs green light with an intensity corresponding to '30' out of '255', and a blue light source outputs blue light with an intensity corresponding to '180' out of '255,' according to the light intensity control signal. A light source 430 may adjust its duty cycle of or an amount of current supplied to LEDs according to light intensity control signals. For example, the current supplied to the LEDs is coordinated in time with the switching of the shift grating 415 and the setting of LCs for pixels of the LCD panel 410. In another example, reducing current supplied to the LED or reducing the 'ON' duration of the duty cycle renders intensity of light from a light source to be reduced (i.e., light to be dimmed).

Figure 5:
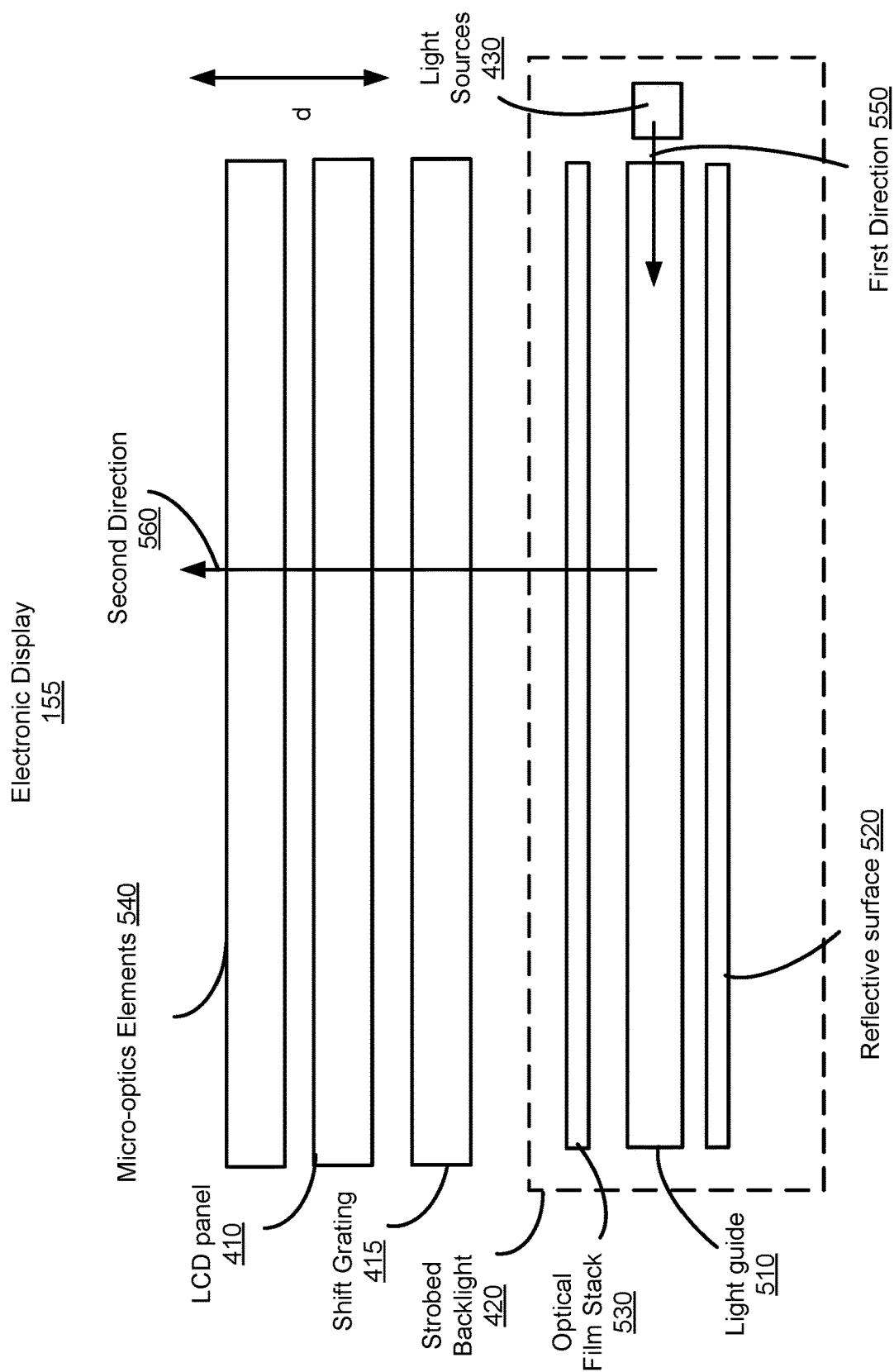
FIG. 5 shows a cross sectional side view of the electronic display, in accordance with some embodiments.

FIG. 5 shows a cross sectional side view of the electronic display 155, in accordance with some embodiments. The cross sectional side view is taken along line A for the electronic display 155 as shown in FIG. 4. The strobed backlight 420 is disposed behind the LCD panel 410 along a depth dimension d. The strobed backlight 420 includes light sources 430, a light guide 510, a reflective surface 520, and an optical film stack 530. The light guide 510 may be composed of a glass material or a transparent plastic material, and refractive and/or reflective components for receiving light from the light sources 430 in a first direction 550 and projecting light towards the LCD panel 410 in a second direction 560. For example, the light guide 510 may include a structure having a series of unevenly spaced bumps that diffuse propagating light. The density of the bumps increase with distance to the light sources 430 according to a diffusion equation. In some embodiments, the light guide 510 receives light with different colors from the light sources 430, and directs combined light including a combination of the different colors in a different direction toward the LCD panel 410 to illuminate the LCD panel 410. The combined light from separately controllable color LEDs may include improved spectrum intensity across different wavelengths compared with using white LEDs.

The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 530 may additionally or alternatively include a reflective polarizer film that reflects unpolarized light back toward the LCD panel 410 that would otherwise be absorbed.

The light guide 510 directs light towards its top and bottom surfaces, where the top surface faces the LCD panel 410 and the bottom surface faces the reflective surface 520. The reflective surface 520 includes an optical mirror that reflects light directed from the bottom surface of the light guide 510 towards the LCD panel 410.

The electronic display 155 may further include micro-optic elements 540 (not shown in FIG. 4). As discussed in greater detail below, the micro-optic elements 540 distribute light from interlaced even or odd pixels of a pixel pair across the pixel space of the pixel pair. As such, a full image is provided across the pixel space of all pixels of the LCD panel even though the strobed backlight 420 alternatively illuminates even or odd pixel lines.

Returning to FIG. 4, the LCD panel 410 receives a liquid crystal (LC) control signal 470 from the controller 440, and passes light from the strobed backlight 420 towards the exit pupil in the direction 405, according to the LC control signal. The LC control signal is a signal indicative of an amount of light to be passed through a liquid crystal layer of the LCD panel 410 for different pixels. The LC control signal operates the LCD panel 410 as an interlaced display with even and odd pixel lines. The LCD panel 410 includes a plurality of liquid crystals, and an orientation of the liquid crystals can be changed according to the light crystal control signal applied across electrodes of the liquid crystal layer.

The controller 440 is a circuitry that receives an input image data, and generates control signals for driving the LCD panel 410, the shift grating 415, and the LED light sources 430. The input image data may correspond to an image or a frame of a video in a virtual reality and/or augmented reality application. The controller 440 generates the light intensity control signal 460 for controlling intensity of light output by the light sources 430. The controller 440 generates the LC control signal 470 for controlling an amount of light passing from the backlight 420 towards the exit pupil 250 through the LCD panel 410 according to the input image data. The controller 440 also generates the shift grating control signal 465 to control the selective blocking of light directed from the strobed backlight 420 by the shift grating 415. As discussed in greater detail below, the controller 440 provides the light intensity control signal to the light sources 430, the LC control signal to the liquid crystal layer 410, and the shift grating control signal to the shift grating 415 at a proper timing to display images.

Figure 6B:
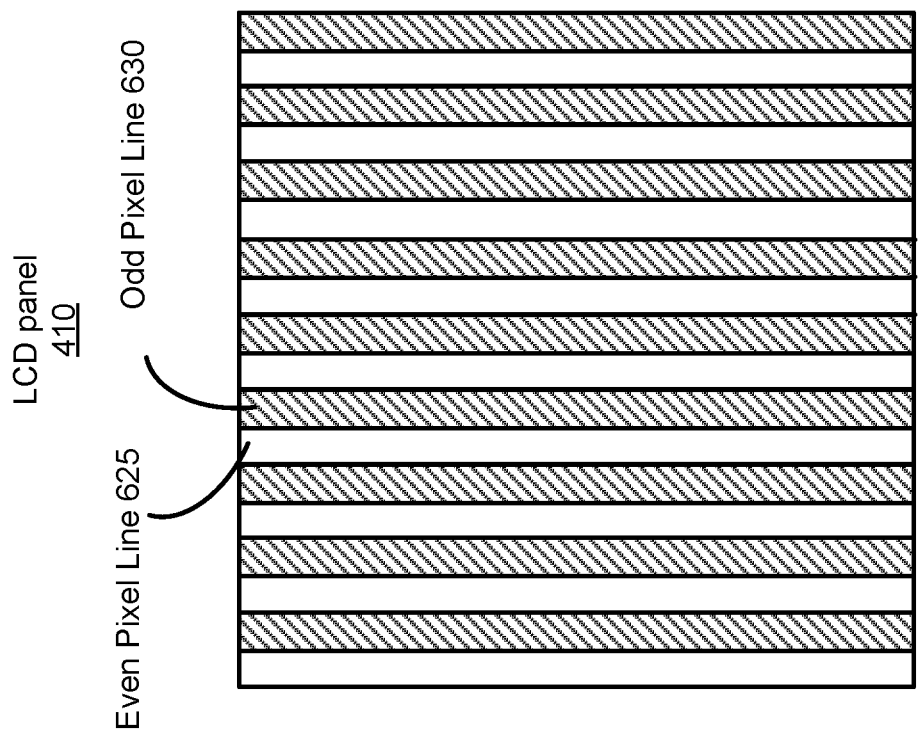

FIGS. 6A and 6B show an LCD panel 410, in accordance with some embodiments. With reference to FIG. 6A, the LCD panel 410 includes a two-dimensional array of pixels, such as pixel 605. The pixels of the LCD panel 410 form pixel lines, such pixel row line 610 or pixel column line 615. Each pixel 605 includes LCs that can be controlled to transition between states based on the LC control signal 470 from the controller 440.

With reference to FIG. 6B, the LCD panel 410 is driven using interlaced scan by LC control signals from the controller 440. The LCD panel 410 includes even pixel lines (shown without hatching) and odd pixel lines (shown with hatching), such as even pixel line 625 and odd pixel line 630. During interlaced scan, the LC control signals 470 set the LCs of even pixel lines in a first scan, and then set the LCs of odd pixel lines in a second scan. In some embodiments, each of the first scan and the second scan of the interlaced scan may use a progressive scan. For example, the even pixel lines for a video frame may be set from left to right and top to bottom; then the odd pixel lines for the video frame may be set from left to right and top to bottom. Although the interlaced even and odd pixel lines are vertical pixel column lines in FIG. 6B, depending on the design and/or orientation of the LCD panel 410, the interlaced even and odd pixel lines may be horizontal pixel row lines, or diagonal pixel lines.

Figure 7:
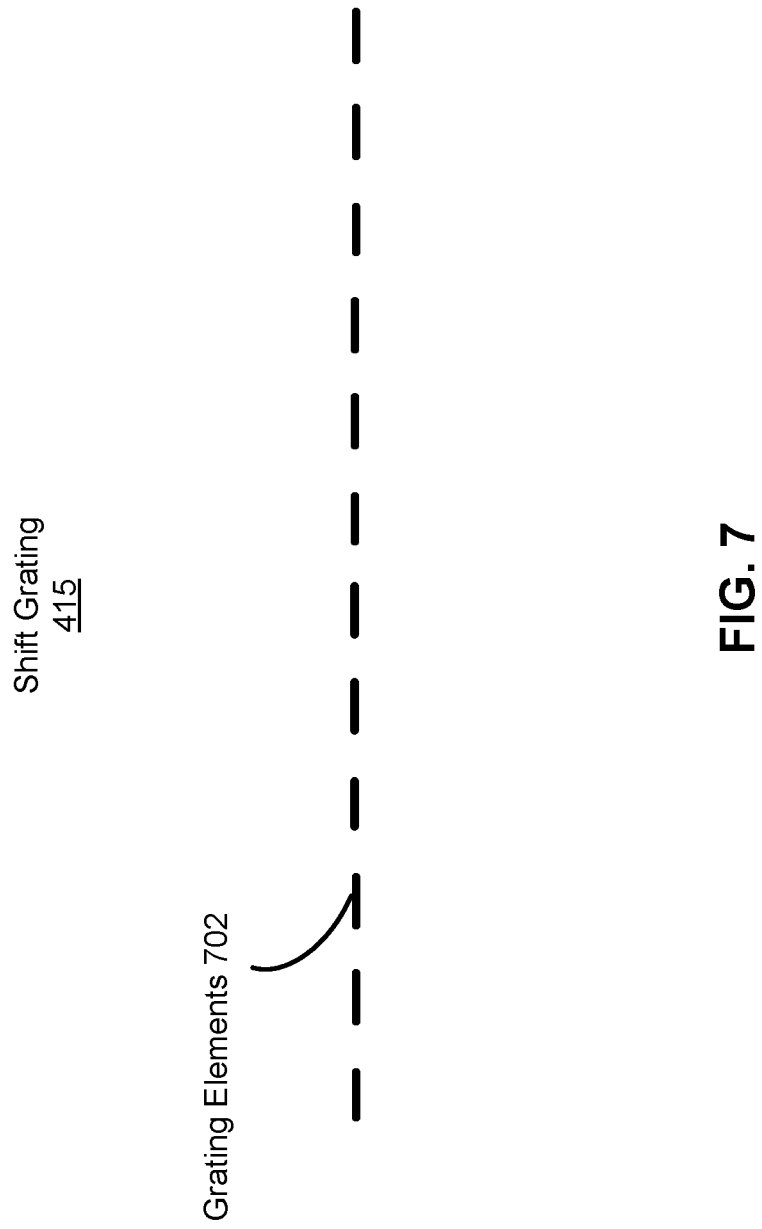
FIG. 7 shows a shift grating, in accordance with some embodiments.

FIG. 7 shows a shift grating 415, in accordance with some embodiments. The shift grating 415 selectively blocks light from the strobed backlight from illuminating either the even pixel lines or the odd pixel lines of the LCD panel 410. In an even state of the shift grating 415, grating elements 702 of the shift grating 415 are aligned with the even pixel lines 625 to block light from the strobed backlight 420 from reaching the even pixel lines 625. In an odd state of the shift grating 415, the grating elements 702 of the shift grating 415 are aligned with the odd pixel lines 630 to block light from the strobed backlight 420 from reaching the odd pixel lines 630. The shift grating 415 switches between the even and odd states based on the shift grating control signal from the controller 440.

In some embodiments, the grating elements 702 may include piezoelectric transducers to provide small, accurate movements of the grating in response to the shift grating control signal. Various other components may be used to alternatively block light to the odd or even pixel lines of the LCD panel. In some embodiments, a spatial light modulator may be used as an alternative to a shift grating to spatially modulate the light input into the LCD panel. In some embodiments, liquid crystal (LC) lines may be used that switch between on and off at a fast rate (for fast switching LC the full on to full off is actually one of the quicker transitions). In some embodiments, an aligned polarizer alternates horizontal and vertical polarization for each even and odd pixel line. An output polarizer complements the input polarizer. The polarizers are switched from one polarization state to another.

Figure 8:
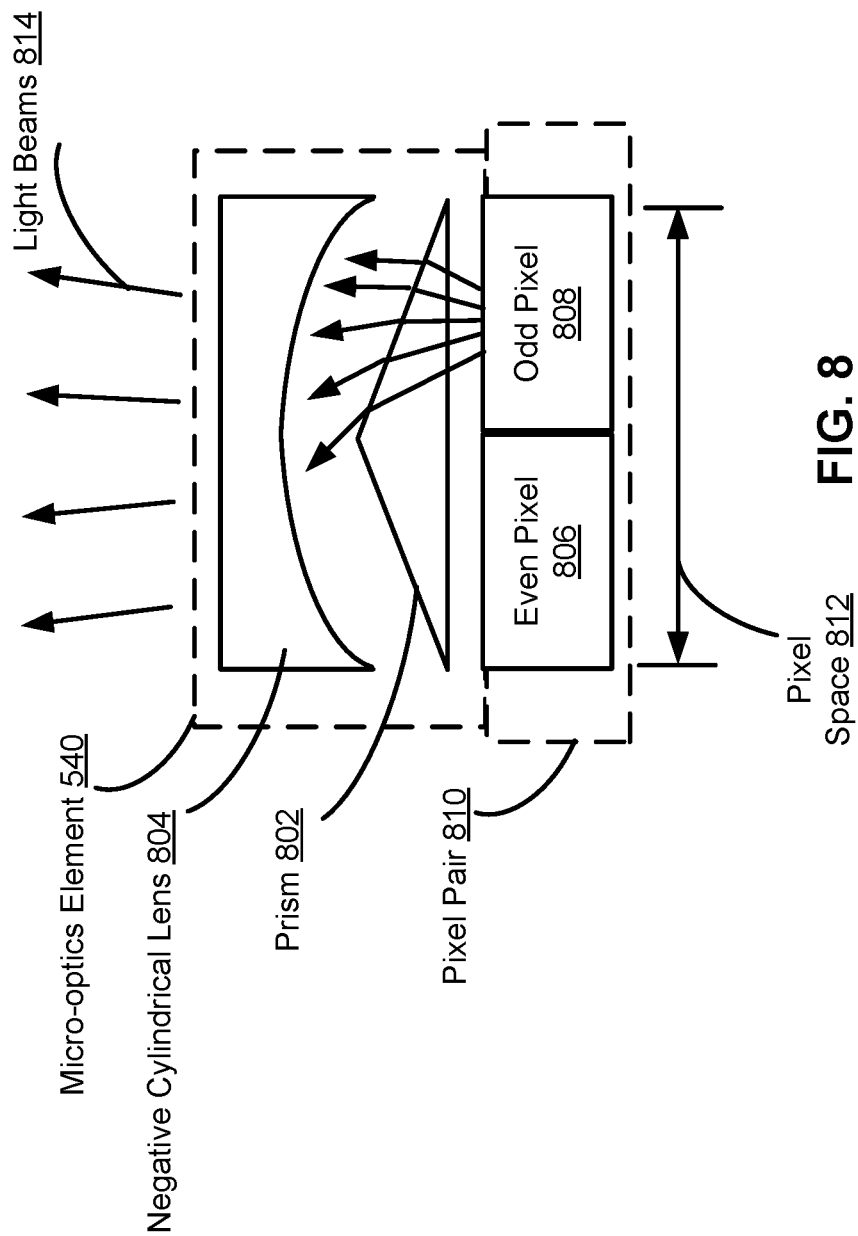
FIG. 8 shows a micro-optics element, in accordance with some embodiments.

FIG. 8 shows a micro-optics element 540, in accordance with some embodiments. The micro-optics element 540 includes a prism 802 and a negative cylindrical lens 804. The micro-optics element 540 is disposed above at least two pixels 806 and 808 of the LCD panel 410. The even pixel 806 and odd pixel 808 are adjacent pixels respectively from an even pixel line and an adjacent odd pixel line, where the even and odd pixel limes form a pixel line pair. As such, even pixel 806 and odd pixel 808 represent a pixel pair 810.

When the even pixel 806 is illuminated by the strobed backlight 420, the micro-optics element 540 spread light from the even pixel 806 across a pixel space 812 of the pixel pair 810. When the odd pixel 808 is illuminated by the strobed backlight 420, the micro-optics element 540 spread light from the odd pixel 808 across a pixel space 812 of the pixel pair 810. The pixel space 812 of the pixel pair 810 is defined by the pixel space of the even pixel 806 and the pixel space of the odd pixel 808.

As shown by light beams 814 emitted from the odd pixel 808, the prism 802 includes two sloped surfaces defining a triangular shape. The sloped surfaces of the prism 802 couple with the light beams 814 from the odd pixel 808, and refracts the light beams 814 through the prism 802 to distribute the light beams 814 across the pixel space 812. The negative cylindrical lens 804 couples with the light beams 814 from the prism 802, and diverges the light beams 814 outwards such that the light beams 814 are spread across a pixel space 812 of the pixel pair 810.

Although not shown in FIG. 8 to ovoid overcomplicating the drawing, the micro-optics element 540 operates in an analogous way for light beams emitted from the even pixel 806. For example, the sloped surfaces of the prism 802 couple with the light beams from the even pixel 806, and refracts the light beams through the prism 802 to distribute the light beams across the pixel space 812. The negative cylindrical lens 804 couples with the light beams from the prism 802, and diverges the light beams 814 outwards such that the light beams 814 are spread across a pixel space 812 of the pixel pair 810.

In some embodiments, each pixel pair 810 is associated with a separate micro-optic element 540. In another example, multiple pixel pairs may share a micro-optic element 540. In another example, the prism 802 and negative cylindrical lines 804 extend across the length of the pixel lines such that each pixel line pair shares a micro-optic element 540. The electronic display 155 may include multiple micro-optic elements 540 disposed in front of the LCD panel 410. In some embodiments, the micro-optic elements 540 may form a layer of connected micro-optic elements. In some embodiments, individual micro-optic elements 540 are disposed on the surface of the LCD panel 410.

Interlaced LCD Control

Figure 9:
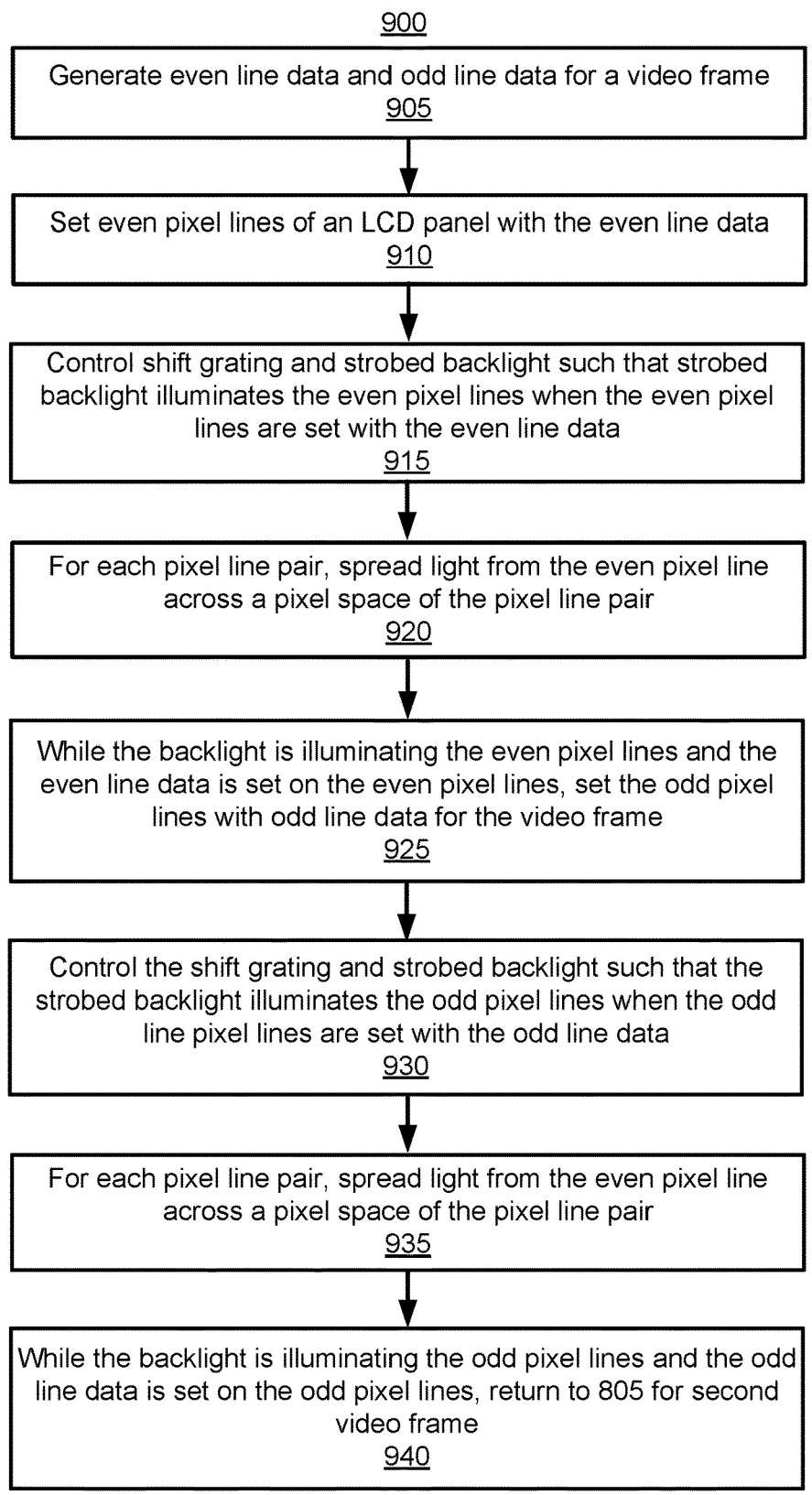
FIG. 9 shows a process for interlaced LCD device control, in accordance with some embodiments.

FIG. 9 shows a process 900 for interlaced LCD device control, in accordance with some embodiments. Process 900 can be performed by, for example, the components of the electronic display 155, as shown in FIG. 4. In other embodiments, some or all of the steps may be performed by other entities. In addition, some embodiments may perform the steps in parallel, perform the steps in different orders, or perform different steps. Process 900 is discussed with reference to timing diagrams 1002 and 1004 shown in FIG. 10, respectively showing control of the even and odd pixel lines, and other display components such as the strobed backlight 420 and shift grating 415, over time for a video frame.

At 905, a controller 440 of an LCD display 155 is configured to generate even line data and odd line data for a frame of video. The even line data refers to data for setting the even pixel lines of the LCD panel 410, and the odd line data refers to data for setting the odd line pixels of the LCD panel 420.

For example, the controller 440 receives input image data from the console 110 or other processor that defines an image of the video frame in a virtual reality and/or augmented reality application. Separating the input image data for the video frame into the even line data and odd line data prepares the input image data for an interlaced scan to the even and odd pixel lines of the LCD panel 410 respectively according to embodiments herein.

In some embodiments, the even line data and odd line data for a frame video frame are the same for each pixel line pair of the LCD panel 410. As discussed above, each pixel line pair includes an even pixel line and an adjacent odd pixel line, and the LCD panel 410 includes multiple pixel line pairs. In one example, the even line data includes the input image data from the console 110 distributed across the even pixel lines, and the odd line data includes the input image data from the console 110 distributed across the odd pixel lines.

At 910, the controller 440 is configured to set the even pixel lines of the LCD panel 410 with the even line data. The controller 440 generates LC control signals to set the pixel lines. Setting pixels or pixel lines may include transitioning the LCs of the pixel from a first state (e.g., of the previous video frame) to a second state (e.g., of the current video frame). The pixels of the LCD panel 410 may include LCs that change physical state, such as twist or untwist, based on parameters of the LC control signal such as voltage level. The state of the LCs determines the level of light transmission through the LCs, and thus the output illumination of the pixels when illuminated by the strobed backlight 420. Thus setting the even line pixels with the even line data prepares the even line pixels for illumination by the strobed backlight 420.

Figure 10:
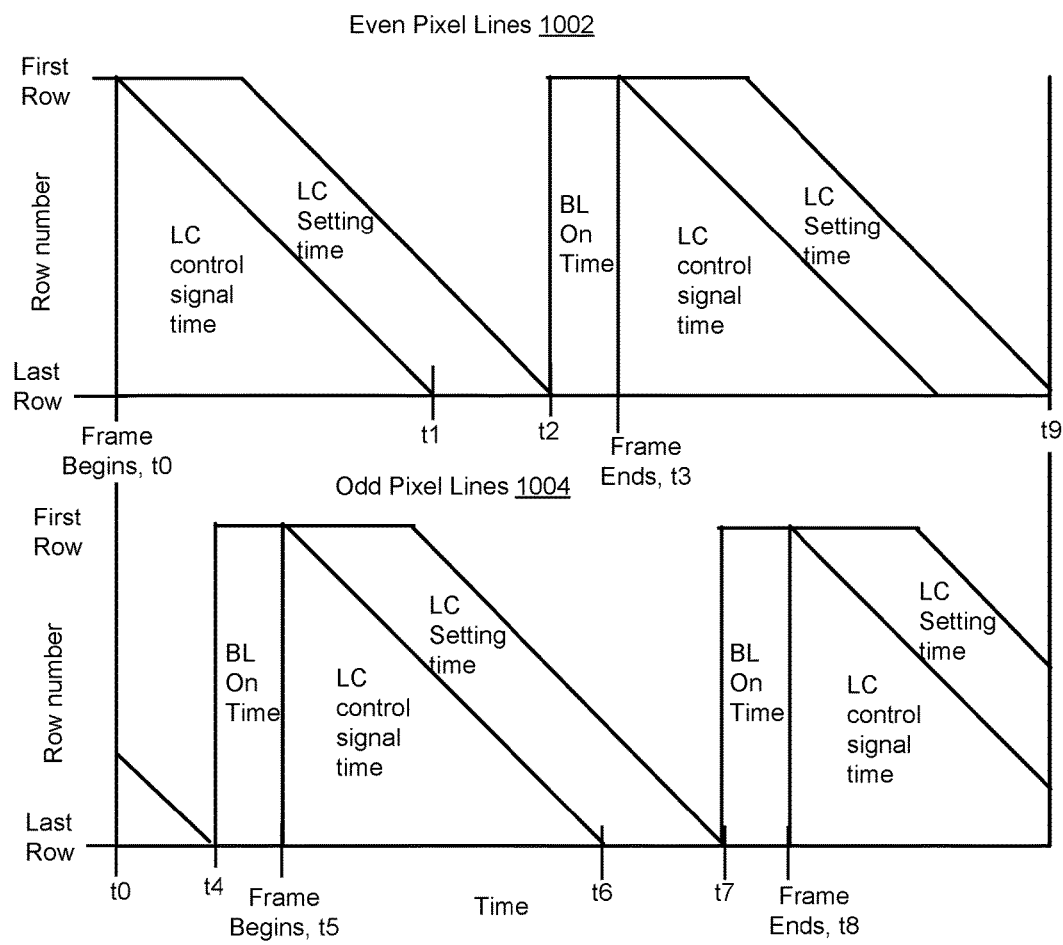
FIG. 10 show timing diagrams for interlaced LCD device control, in accordance with some embodiments.

With reference to the even pixel line timing diagram 1002 shown in FIG. 10, the controller 440 sets the even line pixels by providing the LC control signal beginning at the start of the frame at time t0 by performing a progressive scan of the even line pixels until time t1. At time t1, each of the even line pixels (from the first to the last row of pixels) has received the LC control signal.

At time t2, each of the even line pixels is set and transitioned to the desired state for the video frame. The delay between t1 and t2 represents the LC setting time for the even line pixels.

Although not limited to any particular type of scan, in the embodiment of FIG. 10, the even pixel lines for a video frame may be set from left to right and top to bottom. Here, the top, first pixel row line is set from left to right for the even line pixels, then the next pixel row line is set from left to right for the even line pixels, and so forth until each even pixel line has been set.

With reference to the odd pixel line timing diagram 1004 shown in FIG. 10, the odd line pixels are not set simultaneously with the progressive scan of the even line pixels between t0 and t2. Instead, the odd line pixels may be illuminated with odd line data of a previous video frame while the even line data is being set on the even line pixels of the current video frame as shown between t0 and t5.

While the even line pixels are being set between t0 and t2, the even line pixels are not illuminated by the strobed backlight 420. For example, the controller 440 sets the shift grating 415 to the odd state to block light from the strobed backlight 420 from reaching the even pixel lines between t4 and t5, where the strobed backlight 420 is flashed on to illuminate the odd pixel lines for the previous video frame. In the odd state, the shift grating 415 permits light from the strobed backlight 420 to reach the odd line pixels. Thus the odd line pixels may be illuminated when the strobed backlight 420 is flashed on between t4 and t5, while the even pixel lines are not illuminated when the even pixel lines are being set with even line data and transitioning between LC states between t0 and t2.

At 915, the controller 440 is configured to control the shift grating 415 and strobed backlight 420 such that the strobed backlight 420 illuminates the even pixel lines when the even pixel lines are set with the even line data. With reference to even pixel line timing diagram 1002, the controller 440 provides the light intensity control signal to the strobed backlight 420 to flash between t2 and t3, after all pixels of the even pixel lines are set with the even line data at t2. The controller 440 also provides a shift grating control signal to the shift grating 415 that sets the shift grating 415 to the even state to permit light from the strobed backlight 420 to reach the even pixel lines when the even pixel lines are set with the even line data. In the even state, the shift grating blocks light from the strobed backlight 420 from reaching the odd pixel lines. Therefore, the odd pixel lines are not illuminated by the strobed backlight 420 between t2 and t3.

At 920, for each pixel line pair of the LCD display 410, a micro-optics element 540 spread light from the even pixel line across a pixel space of the pixel line pair. The pixel space of a pixel line pair refers to a combined pixel width defined by two adjacent pixels of an even pixel line and an adjacent odd pixel line. Here, the even pixel lines are set with even line data and illuminated, while the odd pixel lines are not illuminated. The micro-optics effectively projects the even line data on the even pixel lines across pixel space defined by both the even and odd pixel lines of the LCD panel 410. Therefore, even though only the even pixel lines are illuminated between t2 and t3, the image output from the LCD panel 410 appears to project from all pixel lines of the LCD panel 410 rather than only the even pixel lines.

At 925, while the strobed backlight 420 is illuminating the even pixel lines and the even line data is set on the even pixel lines, the controller 440 is configured to set the odd pixel lines with the odd line data for the video frame. For example, the controller sets the odd pixel lines with odd line data between t5 and t7 while the strobed backlight 420 is illuminating the even pixel lines between t2 and t3. In some embodiments, the controller 440 sets the odd line pixels based on a progressive scan of the odd line pixels. For example, the odd pixel lines for the video frame may be set from left to right and top to bottom. The top pixel row line is set from left to right for the odd line pixels, then the next pixel row line is set from left to right for the odd line pixels, and so forth until each odd line pixel has been set.

At 930, the controller 440 is configured to control the shift grating 415 and strobed backlight 420 such that the strobed backlight 420 illuminates the odd pixel lines when the odd line pixel lines are set with the odd line data.

The controller 440 provides the light intensity control signal to the strobed backlight 420 to flash between t7 and t8, after all pixels of the odd pixel lines are set with the odd line data at t7. The controller 440 also provides a shift grating control signal to the shift grating 415 that sets the shift grating 415 to the odd state to permit light from the strobed backlight 420 to reach the odd pixel lines when the odd pixel lines are set with the odd line data. In the odd state, the shift grating blocks light from the strobed backlight 420 from reaching the even pixel lines between t7 and t8.

At 935, for each pixel line pair of the LCD display 410, the micro-optics element 540 spread light from the odd pixel line across a pixel space of the pixel line pair. Here, the odd pixel lines are set with odd line data and illuminated, while the even pixel lines are not illuminated. The micro-optics effectively projects the odd line data on the odd pixel lines across pixel space defined by both the even and odd pixel lines of the LCD panel 410. Therefore, even though only the odd pixel lines are illuminated between t7 and t8, the image output from the LCD panel 410 appears to project from all pixel lines of the LCD panel 410 rather than only the odd pixel lines.

At 940, while the strobed backlight 420 is illuminating the odd pixel lines and the odd line data is set on the odd pixel lines, process 900 may return to 805 for a second (e.g., next) video frame. Process 900 may be repeated for multiple video frames. For each video frame, even line data and odd line data may be handled using the process 900. With reference to FIG. 10, the controller 440 sets the even pixel lines of the LCD panel 410 with the even line data of the second video frame between t3 and t9. This occurs while the strobed backlight 420 is illuminating the odd pixel lines between t7 and t8.

Advantageously, process 900 results in a doubling of the time allotted for pixel line scanning and LC setting before pixel illumination. For example, by running the LCD panel 410 at a 90 Hz interlaced refresh rate, the strobed backlight 420 is flashed on and off at the 90 Hz refresh rate, and the shift grating 415 is switched between even and odd states at the 90 Hz refresh rate such that the strobed backlight 420 alternatively illuminates the even or odd pixel lines per flash. However, each pixel does not need to transition at the 90 Hz refresh rate, and instead can be set at a 45 Hz refresh rate. For each video frame, this doubles the amount of time for LCs of the pixels to complete state transition before illumination by the strobed backlight 420. In some embodiments, the periodicity and/or duty cycle of illuminations by the strobed backlight 420 and shift grating 415 can be set to compensate for slower or variable LC response times.

In some embodiments, the controller 440 sets each of the even and odd pixel lines at a first refresh rate, such as 45 Hz. The controller controls the backlight to flash on and off using a periodic signal defining a second refresh rate, such as 90 Hz. The controller controls the shift grating to block the light from the backlight from reaching either the even pixel lines or the odd pixel lines using a periodic signal defining the second refresh, where the first refresh rate is half the second refresh rate.

ADDITIONAL CONFIGURATION INFORMATION

The foregoing description of the embodiments has been presented for the purpose of illustration; it is not intended to be exhaustive or to limit the patent rights to the precise forms disclosed. For example, the even-odd interlaced scan as discussed herein is not limited to two groups of pixel lines, and may be extended (e.g., interlacing of three groups of pixel lines) to provide additional LC setting time for LCs between flashes of a strobed backlight. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display device, comprising:
   a liquid crystal display (LCD) panel including at least a first group of pixel lines and a second group of pixel lines;
   a backlight disposed behind the LCD panel to emit light toward the first and second groups of pixel lines;
   a shift grating disposed between the LCD and the backlight, the shift grating configured to block the light from the backlight from reaching either the first group of pixel lines or the second group of pixel lines; and
   a controller configured to:
      while the shift grating is blocking the light from the backlight from reaching the first group of pixel lines, set the first group of pixel lines with first group line data for a video frame;
      control the backlight and the shift grating such that the light from the backlight illuminates the first group of pixel lines when the first group of pixel lines are set with the first group line data;
      while the backlight is illuminating the first group of pixel lines, the first group line data is set on the first group of pixel lines, and the shift grating is blocking the light from reaching the second group of pixels lines, set the second group of pixel lines with second group line data for the video frame; and
      control the backlight and the shift grating such that the light from the backlight illuminates the second group of pixel lines and the shift grating blocks the light from reaching the first group of pixel lines when the second group of pixel lines are set with the second group line data.

2. The display device of claim 1, wherein the first group of pixel lines are even pixel lines and the second group of pixel lines are odd pixel lines.

3. The display device of claim 1, wherein the backlight is a strobed backlight, and the controller configured to control the backlight includes the controller being configured to flash the strobe backlight on and off according to a periodic signal.

4. The display device of claim 1, wherein:
   the controller configured to control the shift grating includes the controller being configured to provide a shift grating control signal that transitions the shift grating between a first state and a second state according to a periodic signal;
   the shift grating blocks the light from the backlight from reaching the second group of pixel lines in the first state;
   the shift grating blocks the light from the backlight from reaching the first group of pixel lines in the first state.

5. The display of claim 1, wherein the controller is further configured to:
   while the backlight is illuminating the second group of pixel lines and the second group line data is set on the second group of pixel lines, set the first group of pixel lines with second first group line data for a second video frame; and
   control the back light and the shift grating that the light from the backlight illuminates the first group of pixel lines when the first group of pixel lines are set with the second first group line data.

6. The display device of claim 1, wherein the controller is further configured:
   set the first group of pixel lines with the first group line data using a first progressive scan of the first group of pixel lines; and
   set the second group of pixel lines with the second group line data using a second progressive scan of the second group of pixel lines.

7. A display device, comprising:
   a liquid crystal display (LCD) panel including at least a first group of pixel lines and a second group of pixel lines;
   a backlight disposed behind the LCD panel to emit light toward the first and second groups of pixel lines;
   a shift grating disposed between the LCD and the backlight, the shift grating configured to block the light from the backlight from reaching either the first group of pixel lines or the second group of pixel lines; and
   a controller configured to:
      set the first group of pixel lines with first group line data for a video frame;
      control the backlight and the shift grating such that the light from the backlight illuminates the first group of pixel lines when the first group of pixel lines are set with the first group line data;
      while the backlight is illuminating the first group of pixel lines and the first group line data is set on the first group of pixel lines, set the second group of pixel lines with second group line data for the video frame; and
      control the backlight and the shift grating such that the light from the backlight illuminates the second group of pixel lines when the second group of pixel lines are set with the second group line data; and
   wherein:
      the first group of pixel lines and the second group of pixel lines include pixel line pairs, each pixel line pair including a first pixel line and an adjacent second pixel line; and
      the display device further includes micro-optic elements disposed in front of the LCD panel, the micro-optics elements configured to, for each pixel line pair, spread light from the first pixel line and the adjacent second pixel line across a pixel space of the pixel line pair.

8. The display device of claim 7, wherein each micro-optics element includes a prism and a negative cylindrical lens.

9. A display device, comprising:
   a liquid crystal display (LCD) panel including at least a first group of pixel lines and a second group of pixel lines;
   a backlight disposed behind the LCD panel to emit light toward the first and second groups of pixel lines;
   a shift grating disposed between the LCD and the backlight, the shift grating configured to block the light from the backlight from reaching either the first group of pixel lines or the second group of pixel lines; and
   a controller configured to:
      set the first group of pixel lines with first group line data for a video frame;
      control the backlight and the shift grating such that the light from the backlight illuminates the first group of pixel lines when the first group of pixel lines are set with the first group line data;
      while the backlight is illuminating the first group of pixel lines and the first group line data is set on the first group of pixel lines, set the second group of pixel lines with second group line data for the video frame; and
      control the backlight and the shift grating such that the light from the backlight illuminates the second group of pixel lines when the second group of pixel lines are set with the second group line data; and wherein:
the first group of pixel lines and the second group of pixel lines include pixel line pairs, each pixel line pair including a first pixel line and an adjacent second pixel line; and
the controller is further configured to generate the first group line data and the second group line data from the video frame such that the first group line data and second group line data are the same for each pixel line pair.

10. A display device, comprising:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and
wherein:
the liquid crystals (LCs) of the first group of pixel lines are set with the first group line data within a LC setting time
the LCs of the second group of pixel lines are set with the second group line data within a second LC setting time; and
the controller is configured to control the backlight and the shift grating with periodic signals such that the light from the backlight illuminates the first group of pixel lines after the LC setting time and the light from the backlight illuminates the second group of pixel lines after the second LC setting time.

11. A display device, comprising:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and
wherein:
the controller sets each of the first group of pixel lines and the second group of pixel lines at a first refresh rate;
the controller controls the backlight to flash on and off at a second refresh rate;
the controller controls the shift grating to block the light from the backlight from reaching either the first group of pixel lines or the second group of pixel lines at the second refresh rate; and
the first refresh rate is half the second refresh rate.

12. A head-mounted display (HMD), comprising:
a display device, including:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
while the shift grating is blocking the light from the backlight from reaching the first group of pixel lines, set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines, the first group line data is set on the first group of pixel lines, and the shift grating is blocking the light from reaching the second group of pixels lines, set the second group of pixel lines with second group line data for the video frame; and
control the backlight and the shift grating such that the light from the backlight illuminates the second group of pixel lines and the shift grating blocks the light from reaching the first group of pixel lines when the second group of pixel lines are set with the second group line data.

13. The HMD of claim 12, wherein the first group of pixel lines are even pixel lines and the second group of pixel lines are odd pixel lines.

14. The HMD of claim 12, wherein the backlight is a strobed backlight, and the controller configured to control the backlight includes the controller being configured to flash the strobe backlight on and off according to a periodic signal.

15. The HMD of claim 12, wherein:
the controller configured to control the shift grating includes the controller being configured to provide a shift grating control signal that transitions the shift grating between a first state and a second state according to a periodic signal;

the shift grating blocks the light from the backlight from reaching the second group of pixel lines in the first state;

the shift grating blocks the light from the backlight from reaching the first group of pixel lines in the first state.

16. The HMD of claim 12, wherein the controller is further configured to:

while the backlight is illuminating the second group of pixel lines and the second group line data is set on the second group of pixel lines, set the first group of pixel lines with second first group line data for a second video frame; and control the back light and the shift grating that the light from the backlight illuminates the first group of pixel lines when the first group of pixel lines are set with the second first group line data.

17. The HMD of claim 12, wherein the controller is configured to:

set the first group of pixel lines with the first group line data using a first progressive scan of the first group of pixel lines; and set the second group of pixel lines with the second group line data using a second progressive scan of the second group of pixel lines.

18. A head-mounted display (HMD), comprising:
a display device, including:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and
wherein:
the first group of pixel lines and the second group of pixel lines include pixel line pairs, each pixel line pair including a first pixel line and an adjacent second pixel line; and
the display device further includes micro-optic elements disposed in front of the LCD panel, the micro-optics elements configured to, for each pixel line pair, spread light from the first pixel line and the adjacent second pixel line across a pixel space of the pixel line pair.

19. The HMD of claim 18, wherein each micro-optics element includes a prism and a negative cylindrical lens.

20. A head-mounted display (HMD), comprising:
a display device, including:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and
wherein:
the first group of pixel lines and the second group of pixel lines include pixel line pairs, each pixel line pair including a first pixel line and an adjacent second pixel line; and
the controller is further configured to generate the first group line data and the second group line data from the video frame such that the first group line data and second group line data are the same for each pixel line pair.

21. A head-mounted display (HMD), comprising:
a display device, including:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and wherein:
the liquid crystals (LCs) of the first group of pixel lines are set with the first group line data within a LC setting time
the LCs of the second group of pixel lines are set with the second group line data within a second LC setting time; and
the controller is configured to control the backlight and the shift grating with periodic signals such that the light from the backlight illuminates the first group of pixel lines after the LC setting time and the light from the backlight illuminates the second group of pixel lines after the second LC setting time.

22. A head-mounted display (HMD), comprising:
a display device, including:
a liquid crystal display (LCD) panel including at least a first group of pixel lines and a second group of pixel lines;
a backlight disposed behind the LCD panel to emit light toward the first and second groups of pixel lines;
a shift grating disposed between the LCD and the backlight, the shift grating configured to block the light from the backlight from reaching either the first group of pixel lines or the second group of pixel lines; and
a controller configured to:
set the first group of pixel lines with first group line data for a video frame;
control the backlight and the shift grating such that the light from the backlight illuminates the first group of pixel lines when the first group of pixel lines are set with the first group line data;
while the backlight is illuminating the first group of pixel lines and the first group line data is set on the first group of pixel lines, set the second group of pixel lines with second group line data for the video frame; and
control the backlight and the shift grating such that the light from the backlight illuminates the second group of pixel lines when the second group of pixel lines are set with the second group line data; and
wherein:
the controller sets each of the first group of pixel lines and the second group of pixel lines at a first refresh rate;
the controller controls the backlight to flash on and off at a second refresh rate;
the controller controls the shift grating to block the light from the backlight from reaching either the first group of pixel lines or the second group of pixel lines at the second refresh rate; and
the first refresh rate is half the second refresh rate.

* * * * *

UNITED STATES PATENT AND TRADEMARK OFFICE
CERTIFICATE OF CORRECTION

PATENT NO. : 10,170,060 B2
APPLICATION NO. : 15/391034
DATED : January 1, 2019
INVENTOR(S) : Shie Ping Jeffrey Tseng et al.

Page 1 of 1

It is certified that error appears in the above-identified patent and that said Letters Patent is hereby corrected as shown below:

In the Claims

Column 17, Lines 48, 49, and 50, Claim 4, delete "first state; the shift grating blocks" and insert -- first state; and the shift grating blocks --.

Column 17, Lines 63 and 64, Claim 6, delete "the controller is further configured:" and insert -- the controller is further configured to: --.

Column 18, Lines 36 and 37, Claim 7, delete "the micro-optics elements configured to" and insert -- the micro-optic elements configured to --.

Column 18, Lines 41 and 42, Claim 8, delete "each micro-optics element" and insert -- each micro-optic element --.

Column 21, Lines 5, 6, and 7, Claim 15, delete "first state; the shift grating blocks" and insert -- first state; and the shift grating blocks --.

Column 21, Lines 61 and 62, Claim 18, delete "the micro-optics elements configured to" and insert -- the micro-optic elements configured to --.

Column 21, Lines 66 and 67, Claim 19, delete "each micro-optics element" and insert -- each micro-optic element --.

Signed and Sealed this
Ninth Day of July, 2019

Andrei Iancu
*Director of the United States Patent and Trademark Office*